United States Patent [19]

Dohi et al.

[11] Patent Number: 5,623,486

[45] Date of Patent: Apr. 22, 1997

[54] TRANSMISSION POWER CONTROL METHOD AND APPARATUS FOR MOBILE COMMUNICATIONS USING A CDMA (CODE DIVISION MULTIPLE ACCESS) SYSTEM

[75] Inventors: Tomohiro Dohi, Yokohama; Mamoru Sawahashi, Yokosuka; Koji Ohno, Yokohama, all of Japan

[73] Assignee: NTT Mobile Communication Network Inc., Tokyo, Japan

[21] Appl. No.: 442,955

[22] Filed: May 17, 1995

[30] Foreign Application Priority Data

May 20, 1994 [JP] Japan .................................. 6-106940
Apr. 3, 1995 [JP] Japan .................................. 7-077938

[51] Int. Cl.⁶ .................................................. H04J 13/00
[52] U.S. Cl. ........................... 370/342; 455/38.3; 455/69
[58] Field of Search .......................... 370/18, 95.1, 95.3, 370/100.1, 105.1, 110.1; 375/200, 205, 219, 221, 262, 316, 341, 340, 253; 340/825.04, 825.44; 455/13.4, 38.1, 38.3, 53.1, 54.1, 68, 69, 70; 371/43, 44, 45

[56] References Cited

U.S. PATENT DOCUMENTS

| | | | |
|---|---|---|---|
| 4,261,054 | 4/1981 | Scharla-Nielsen | 455/12 |
| 5,241,563 | 8/1993 | Paik et al. | 370/18 |
| 5,265,119 | 11/1993 | Gilhousen et al. | 370/18 |
| 5,267,262 | 11/1993 | Wheatly, III | 370/18 |
| 5,280,537 | 1/1994 | Sugiyama et al. | 370/18 |
| 5,396,516 | 3/1995 | Padovani et al. | 370/84 |
| 5,442,627 | 8/1995 | Viterbi et al. | 370/22 |

FOREIGN PATENT DOCUMENTS 2253123 8/1992 United Kingdom.

OTHER PUBLICATIONS

IEEE Journal on Selected Areas in Communication, vol. 11, No. 7 pp. 1085–1095, XP000400018 F. Simpson & J.M. Holtzman 'Direct Sequence CDMA Power Control, Interleaving and Coding' p. 1086, left col., line 32–right col., line 38.

Primary Examiner—Benedict V. Safourek
Assistant Examiner—Ricky Ngo
Attorney, Agent, or Firm—Rogers & Wells

[57] ABSTRACT

A transmission power control method is disclosed for controlling transmission power of radio communications in a CDMA system. The transmission power of a first transmitted signal transmitted from a first station is determined by a transmission power control signal contained in a second transmitted signal sent from a second station. The first station receives the second transmitted signal in the form of convolutional codes, and decodes it by using a first Viterbi decoder and a second Viterbi decoder. The first and second Viterbi decoders includes path memories with the path history length of different first predetermined lengths. The transmission power control signal contained in the second transmitted signal is extracted from the output of the second Viterbi decoder, whereas the other information data is obtained from the output of the first Viterbi decoder. The first station controls the transmission power of the first transmitted signal on the basis of the extracted transmission power control signal.

14 Claims, 8 Drawing Sheets

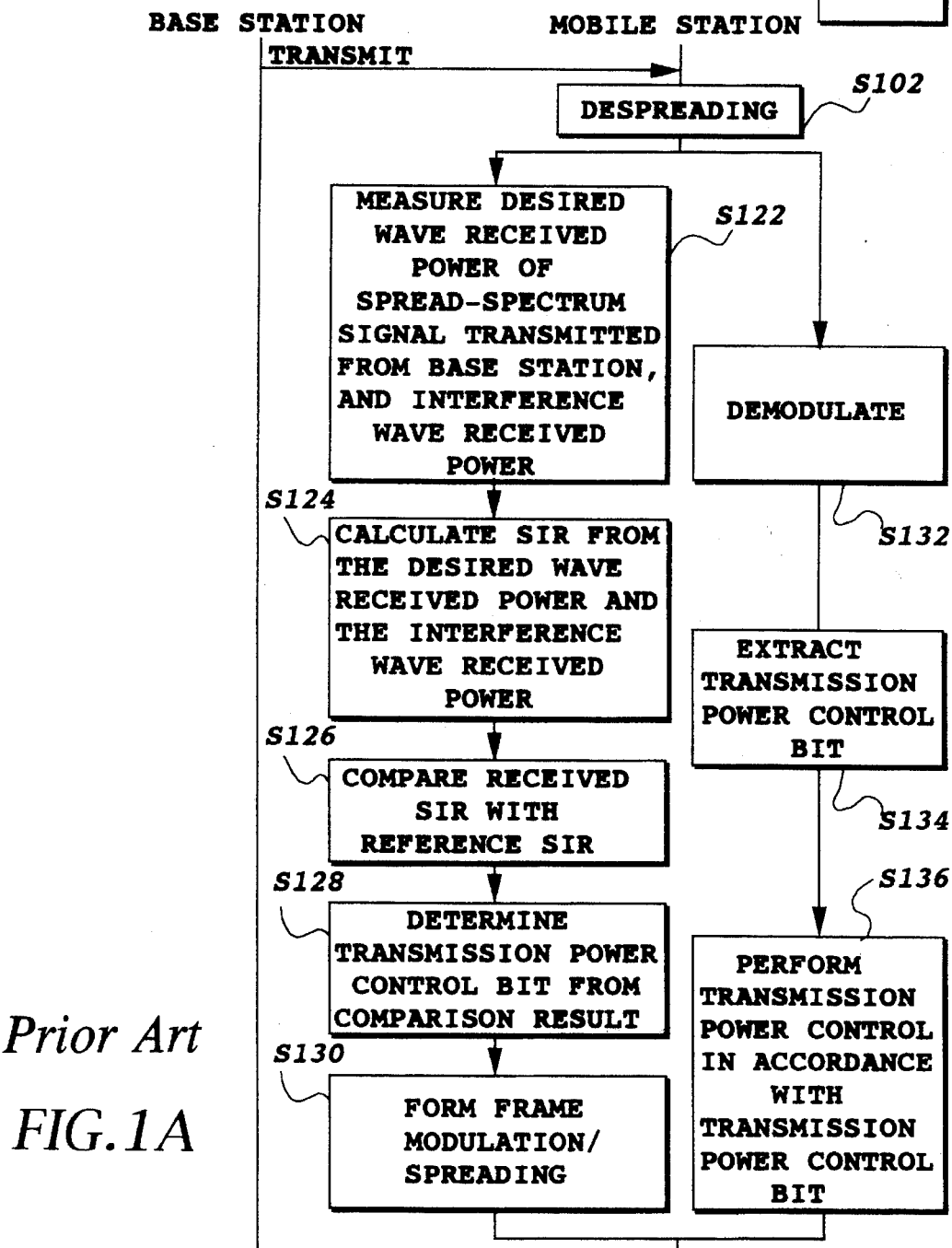
*Prior Art* FIG.1A

TRANSMISSION POWER CONTROL METHOD AND APPARATUS FOR MOBILE COMMUNICATIONS USING A CDMA (CODE DIVISION MULTIPLE ACCESS) SYSTEM

BACKGROUND OF THE INVENTION

1. Field of the Invention

The present invention relates to a radio system, and more particularly to a transmission power control method and apparatus for mobile communications using a CDMA (Code Division Multiple Access) system.

2. Description of Related Art

As is well known, since a plurality of users share the same frequency band in a CDMA system, signals from other users interfere with the signal of a user, thereby degrading the communication quality of the user. In addition, when a first mobile station near a base station and a second mobile station far away from the base station perform communications at the same time, a transmitted signal from the first mobile station will be received at higher power by the base station, and a transmitted signal from the second mobile station will be received at lower power.

Thus, a near-far problem arises in that channel quality will be greatly degraded in communications between a base station and far away mobile stations owing to the interference from mobile stations near the base station. In view of this, transmission power control has been studied as a technique for overcoming the near-far problem. The transmission power control in a transmitting station is carried out by controlling transmission power in such a manner that the received power by a receiving station, or the SIR (Signal-to-Interference power Ratio) obtained from the received power is kept constant, independent of the locations of the transmitting station, thereby providing uniform channel quality throughout the service area. In particular, in reverse (from mobile station to base station) channels, the transmission power control in respective mobile stations is performed such that the received power of signals transmitted from the mobile stations and received by the base station, or the SIR associated with the received power is kept constant at the base station.

Since CDMA systems consider the interferences from the other users as white noise, equivalent noise power increases with the number of users, and the capacity in terms of the number of subscribers in a cell is determined on the basis of the received SIR which can provide predetermined channel quality.

On the other hand, the received SIR is kept constant in forward (from base station to mobile station) channels. This is because an intended channel signal travels from a base station to a mobile station through the same propagation paths as the signals for other users which cause the interference, and undergoes the same fluctuations as the interference waves, which fluctuations include long-term, short-term, and instantaneous fluctuations. Therefore, the received SIR is constant in forward channels, and hence, the transmission power control is not required when taking account of only the interference in the same cell.

The CDMA system, which handles the interference as white noise, however, must take account of the interferences from other cells because it shares the same frequency band with the adjacent cells. Although the interference power from other cells is caused by instantaneous fluctuations due to Rayleigh fading as the interference power in the same cell, the fluctuations differ from those of the desired signal.

According to the CDMA system standard by TIA (Telecommunications Industry Association), the forward transmission power control is not performed basically, but the transmission power of the base station to a mobile station is increased when a frame error rate at the base station exceeds a predetermined threshold level. This is because a large quantity of transmission power changes will increase the interference to other cells. This conventional system, however, cannot follow the instantaneous fluctuations due to the interferences from other cells, which are caused by the transmitted signals from the base stations of other cells.

A transmission power control method based on a closed loop control using a transmission power control bit is known as a conventional transmission power control method that can track the instantaneous fluctuations.

FIGS. 1A and 1B show an example of the transmission power control method based on the closed loop control when the base station communicates with a mobile station within the cell. As shown in FIGS. 1A and 1B, the mobile station despreads a received signal from the base station at step S102, and then, measures the received power of the desired signal from the base station and that of interference at step S122. Subsequently, the mobile station calculates a received SIR based on the measured results at step S124, compares the received SIR with a reference SIR at step S126, and determines the transmission power control bit for controlling the transmission power of the base station on the basis of the comparison result at step S128. Then, the mobile station forms a frame which includes the transmission power control bit at step S130, and transmits it to the base station. In parallel with this, the mobile station demodulates a signal transmitted from the base station at step S132, extracts a transmission power control bit at step S134, and decides its own transmission power in accordance with the command of the transmission power control bit sent from the base station at step S136.

Similarly, the base station despreads a received signal from the mobile station at step S142, demodulates it at step S172, extracts a transmission power control bit at step S174, and determines its own transmission power in accordance with the command of the transmission power control bit sent from the mobile station at seep S176. Furthermore, the base station measures the received power of the desired signal from the mobile station and that of interference at step S162, calculates received SIR at step S164, compares the received SIR with a reference SIR at step S166, and determines a transmission power control bit for controlling the transmission power of the mobile station on the basis of the measured result at step S168. The base station then forms a frame by inserting the transmission power control bit into a signal to be transmitted at step S170, and sends it to the mobile station.

In the conventional closed loop transmission to power control method described above in connection with FIGS. 1A and 1B, high reliability of the transmission power control bit is required. This requirement arises out of the possibility that an erroneous transmission power control bit due to degradation of the communication path might result in power control opposite to the required control. This will increase interference to other users because of excessive transmission power, or result in insufficient channel quality because of the lack of transmission power.

Error correction coding for the transmission power control bit is effective in improving the reliability of the transmission power control bit. In particular, convolutional coding/Viterbi decoding, which has high correcting ability for random errors, is effective for cellular CDMA systems because errors are made random by the bandwidth spreading in the CDMA system. The Viterbi decoding, however, requires a path memory whose path history length is five to six times the constraint length of a convolutional code. Therefore, decoding of the transmission power control bit causes a delay corresponding to the path history length of the path memory. This presents a problem in that instantaneous changes in communication path cannot be followed, and this hinders high accuracy transmission power control.

SUMMARY OF THE INVENTION

In view of this, an objective of the present invention is to provide a highly accurate, fast responsive transmission power control method and apparatus for CDMA systems using transmission power control bit.

In a first aspect of the present invention, a transmission power control method for radio communications using a CDMA (Code Division Multiple Access) system is provided, which method controls transmission power of a first transmitted signal radiated from a first station in accordance with a transmission power control signal contained in a second transmitted signal sent from a second station and received at the first station, the first and second transmitted signal being expressed in the form of convolutional codes, the method comprising the steps of:

decoding, at the first station, the second transmitted signal by using a first Viterbi decoder including a path memory with a path history length of a first predetermined length;

decoding, at the first station, the second transmitted signal by using a second Viterbi decoder including a path memory with a path history length of a second predetermined length which is shorter than the first predetermined length;

extracting, at the first station, the transmission power control signal contained in the second transmitted signal from an output of the second Viterbi decoder;

controlling, at the first station, the transmission power of the first transmitted signal of the first station by using the transmission power control signal extracted from the output of the second Viterbi decoder; and obtaining, at the first station, information data other than the transmission power control signal from an output of the first Viterbi decoder.

The first predetermined path history length may be five times a constraint length of the convolutional codes, and the second predetermined path history length is twice the constraint length.

The transmission power control method may further comprise the steps of:

measuring, at the second station, received power of the first transmitted signal from the first station;

determining, at the second station, transmission power of the first transmitted signal on the basis of the received power;

generating, at the second station, the transmission power control signal corresponding to the transmission power determined at the step of determining;

inserting, at the second station, the transmission power control signal into the second transmitted signal;

performing, at the second station, convolutional encoding of the second transmitted signal which includes the transmission power control signal; and transmitting the second transmitted signal from the second station.

The first station may be a mobile station and the second station may be a base station of the CDMA system.

The first station may be a base station and the second station may be a mobile station of the CDMA system.

The transmission power control method may further comprise the steps of:

interleaving, at the first station, the convolutional codes to produce an interleaved signal;

modulating, at the first station, the interleaved signal to produce a modulated signal;

spreading, at the first stat ion, the modulated signal by using a spreading code to produce a spread signal; and transmitting the spread signal from the first station to the second station.

The transmission power control method may further comprise the steps of:

receiving, at the second station, the spread signal sent from the first station;

despreading, at the second station, the spread signal by using a replica of the spreading code to produce a despread signal;

demodulating, at the second station, the despread signal to produce a demodulated signal;

deinterleaving, at the second station, the demodulated signal to produce a deinterleaved signal; and providing, at the second station, the first Viterbi decoder and the second Viterbi decoder with the deinterleaved signal.

In a second aspect of the present invention, a transmission power control apparatus for radio communications using a CDMA (Code Division Multiple Access) system is provided, which apparatus controls transmission power of a first transmitted signal radiated from a first station in accordance with a transmission power control signal contained in a second transmitted signal sent from a second station and received at the first station, the first and second transmitted signal being expressed in the form of convolutional codes, the apparatus comprising:

means for decoding, at the first station, the second transmitted signal by using a first Viterbi decoder including a path memory with a path history length of a first predetermined length;

means for decoding, at the first station, the second transmitted signal by using a second Viterbi decoder including a path memory with a path history length of a second predetermined length which is shorter than the first predetermined length;

means for extracting, at the first station, the transmission power control signal contained in the second transmitted signal from an output of the second Viterbi decoder;

means for controlling, at the first station, the transmission power of the first transmitted signal of the first station by using the transmission power control signal extracted from the output of the second Viterbi decoder; and means for obtaining, at the first station, information data other than the transmission power control signal from an output of the first Viterbi decoder.

The first predetermined path history length may be five times a constraint length of the convolutional codes, and the second predetermined path history length is twice the constraint length.

The transmission power control apparatus may further comprise:

means for measuring, at the second station, received power of the first transmitted signal from the first station;

means for determining, at the second station, transmission power of the first transmitted signal on the basis of the received power;

means for generating, at the second station, the transmission power control signal corresponding to the transmission power determined by the means for determining;

means for inserting, at the second station, the transmission power control signal into the second transmitted signal;

means for performing, at the second station, convolutional encoding of the second transmitted signal which includes the transmission power control signal; and means for transmitting the second transmitted signal from the second station.

The first station may be a mobile station and the second station may be a base station of the CDMA system.

The first station may be a base station and the second station may be a mobile station of the CDMA system.

The transmission power control apparatus may further comprise:

means for interleaving, at the first station, the convolutional codes to produce an interleaved signal;

means for modulating, at the first station, the interleaved signal to produce a modulated signal;

means for spreading, at the first station, the modulated signal by using a spreading code to produce a spread signal; and means for transmitting the spread signal from the first station to the second station.

The transmission power control apparatus may further comprise:

means for receiving, at the second station, the spread signal sent from the first station;

means for despreading, at the second station, the spread signal by using a replica of the spreading code to produce a despread signal;

means for demodulating, at the second station, the despread signal to produce a demodulated signal;

means for deinterleaving, at the second station, the demodulated signal to produce a deinterleaved signal; and means for providing, at the second station, the first Viterbi decoder and the second Viterbi decoder with the deinterleaved signal.

According to the present invention, there is provided at a receiver side, a normal Viterbi decoder having a path memory whose path history length is about five times the constraint length of a convolutional code, and a simplified Viterbi decoder having a path memory whose path history length is shorter than that of the normal Viterbi decoder. The transmitted signal in the form of convolutional codes is decoded by the normal Viterbi decoder, whereas the transmission power control bit is decoded by the simplified Viterbi decoder in a short time, thereby achieving transmission power control based on the decoded results. This makes it possible to implement a highly accurate, fast responsive transmission power control.

The above and other objects, effects, features and advantages of the present invention will become more apparent from the following description of the embodiments thereof taken in conjunction with the accompanying drawings.

BRIEF DESCRIPTION OF THE DRAWINGS

FIG. 1 is a chart showing arrangement of FIGS. 1A and 1B;

FIGS. 1A and 1B are flowcharts explaining the principle of a conventional transmission power control method;

FIG. 4 is a chart showing arrangement of FIGS. 4A and 4B;

DETAILED DESCRIPTION OF PREFERRED EMBODIMENTS

The invention will now be described with reference to the accompanying drawings.

EMBODIMENT 1

Figure 1B:
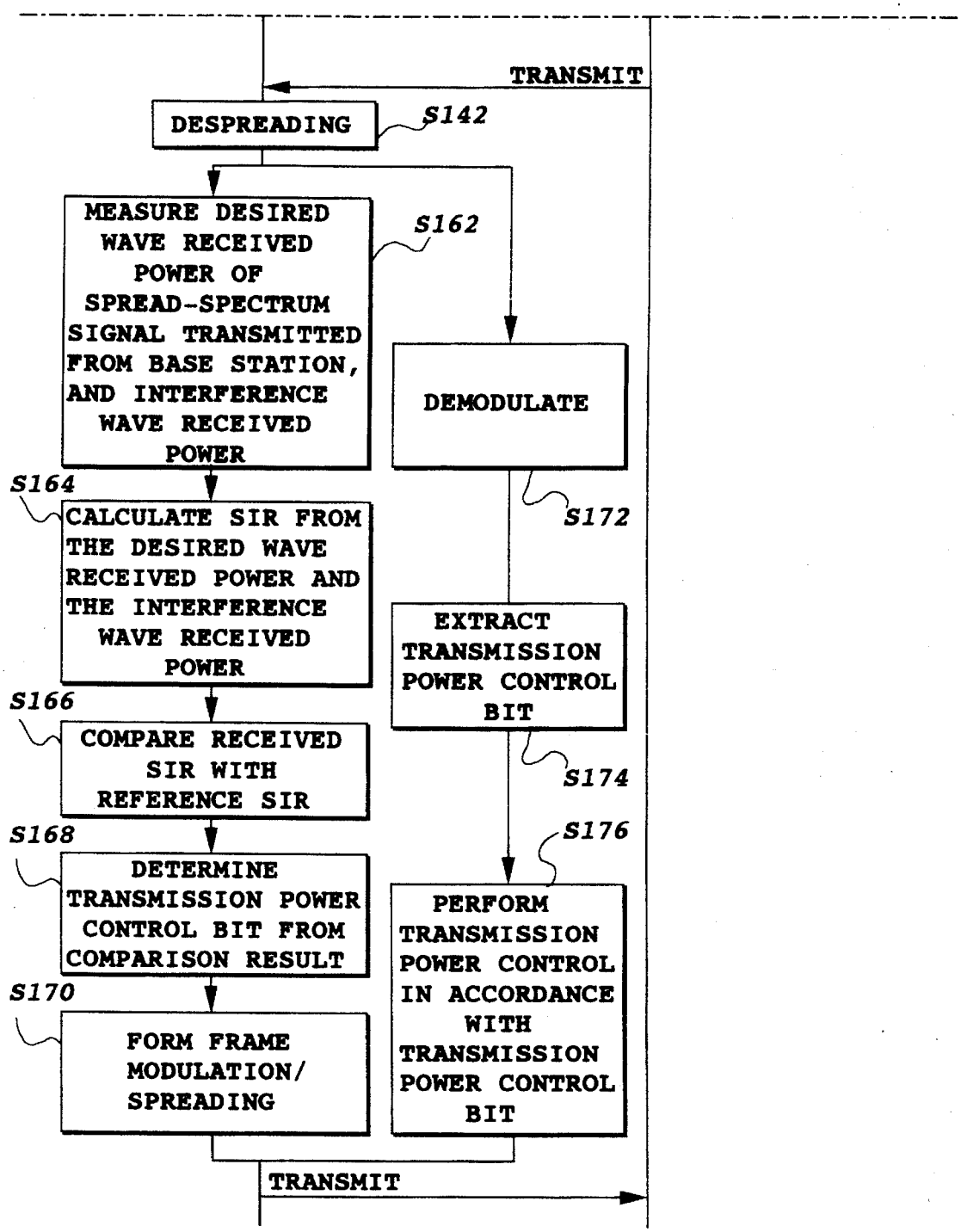
Figure 2:
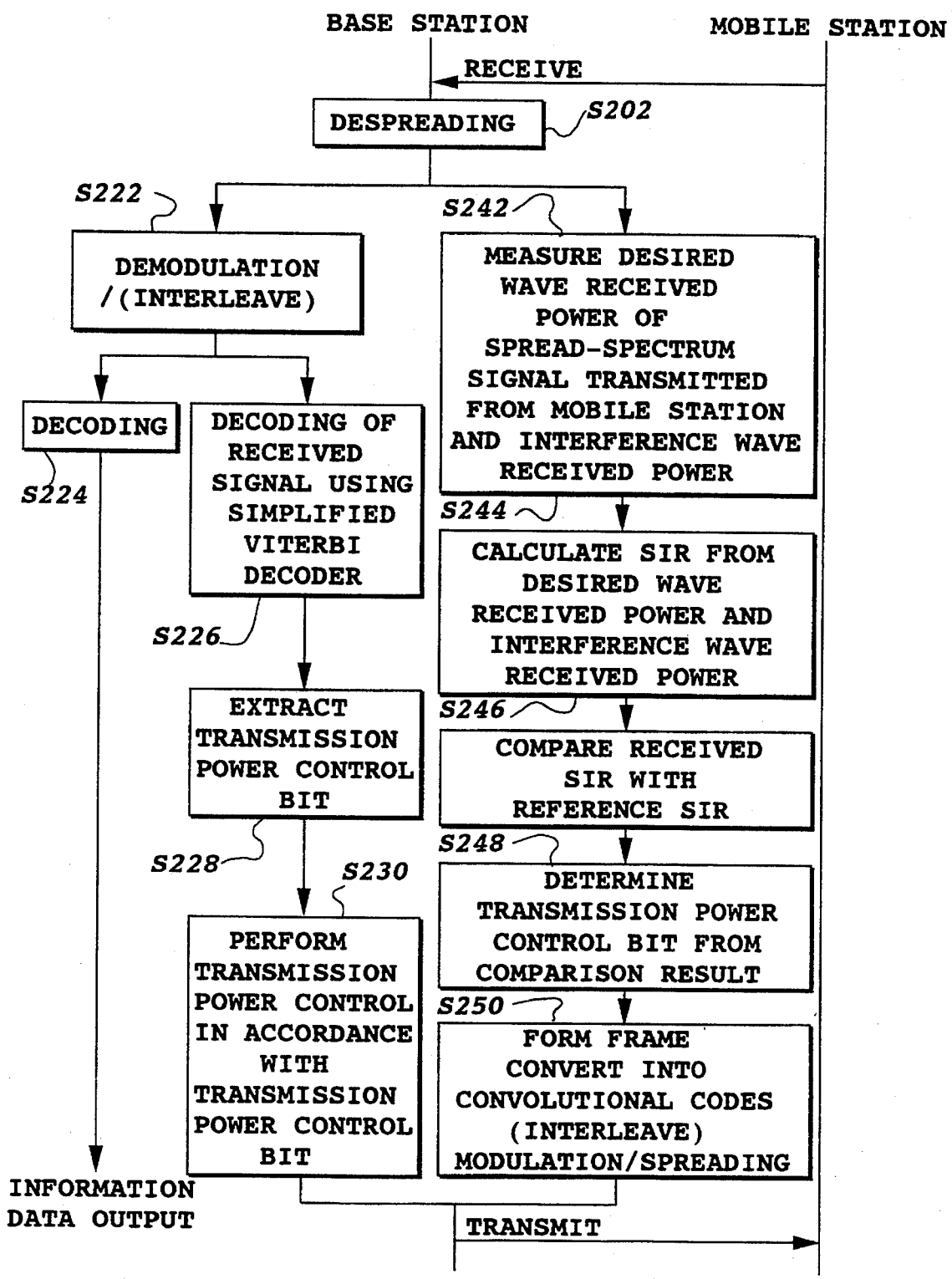
FIG. 2 is a flowchart showing the principle of a transmission power control method in accordance with the present invention.

FIG. 2 illustrates the sequence of a transmission power control method in accordance with the present invention. The present invention is applicable not only to the transmission power control in base stations but also to that in mobile stations. Here, a transmission power control apparatus in accordance with the present invention will be described by taking an example applied to the transmission power control in a base station.

When a base station communicates with a mobile station in the cell associated with the base station, the base station despreads a received signal sent from the mobile station at step S202, carries out demodulation and deinterleaving (when the mobile station interleaves) at step S222, and divides the received signal into two portions. A first portion is decoded by a normal Viterbi decoder including a path memory whose path history length is about five times longer than the constraint length of the received signal (convolutional codes) at step S224. The output of the normal Viterbi decoder is used as information data. Details of the Viterbi decoder are described in the following books, for example: A. M. Michelson and A. H. Levesque, "Error-Control Techniques for Digital Communication", Wiley-Interscience Publication (ISBN 0-471-88074-4); S. Lin and D. J. Costello, "Error Control Coding: Fundamentals and Applications", Prentice-Hall, Inc, (ISBN 0-13-283796-X); V. K. Bhargava, D. Haccoun, R. Matyas, and P. P. Nuspl, "Digital Communications by Satellite", Wiley-Interscience Publication, (ISBN 0-471-08316-X); and J. G. Proakis and M. Salehi, "Communication Systems Engineering", Prentice Hall, (ISBN 0-13-158932-6), which are incorporated here by reference.

The decoding delay of the Viterbi decoder equals the path history length of the path memory. The normal Viterbi decoder uses a path memory with the path history length of about five times the constraint length of a convolutional encoder. Accordingly, when the constraint length is 7 bits, the path history length of the path memory becomes 7×5=35 bits. Thus, quickly responsive transmission power control which can follow instantaneous fluctuations cannot be achieved if the transmission power control is carried out in accordance with the transmission power control bit decoded by the normal Viterbi decoder because it provides the transmission power control bit with a delay corresponding to the path history length during the decoding.

In view of this, this embodiment is provided with a second, simplified Viterbi decoder having a path memory with the path history length shorter than that of the normal Viterbi decoder. The base station decodes the received signal using the simplified Viterbi decoder at step S226, extracts the transmission power control bit at step S228, and decides the transmission power in accordance with the command of the transmission power control bit at step S230. The path history length of the simplified Viterbi decoder is set at about twice the constraint length, or approximately, about 14 bits. This means that decoding interval of the that simplified Viterbi decoder can be reduced to ⅖ of that of the normal Viterbi decoder, which makes it possible to follow instantaneous fluctuations.

In parallel with the above-described steps, the base station measures the received power of a desired signal and that of interference at step S242, after despreading the received signal from the mobile station at step S202. Subsequently, the base station calculates a received SIR of the received power of the desired signal to that of the interference at step S244, compares the received SIR with a predetermined reference SIR at step S246, and decides the transmission power control bit for controlling the transmission power of the mobile station on the basis of the compared result at step S248. The base station then inserts the transmission power control bit into a frame to be transmitted, encoding the frame no convolutional codes, and performs modulation and spreading of the frame at step S250, and then transmits it to the mobile station. The frame which has been converted into convolutional codes may be interleaved at step S250 to improve the efficiency of the convolutional coding/Viterbi decoding.

A method for determining the path history length of the second, simplified Viterbi decoder will now be described.

Figure 3:
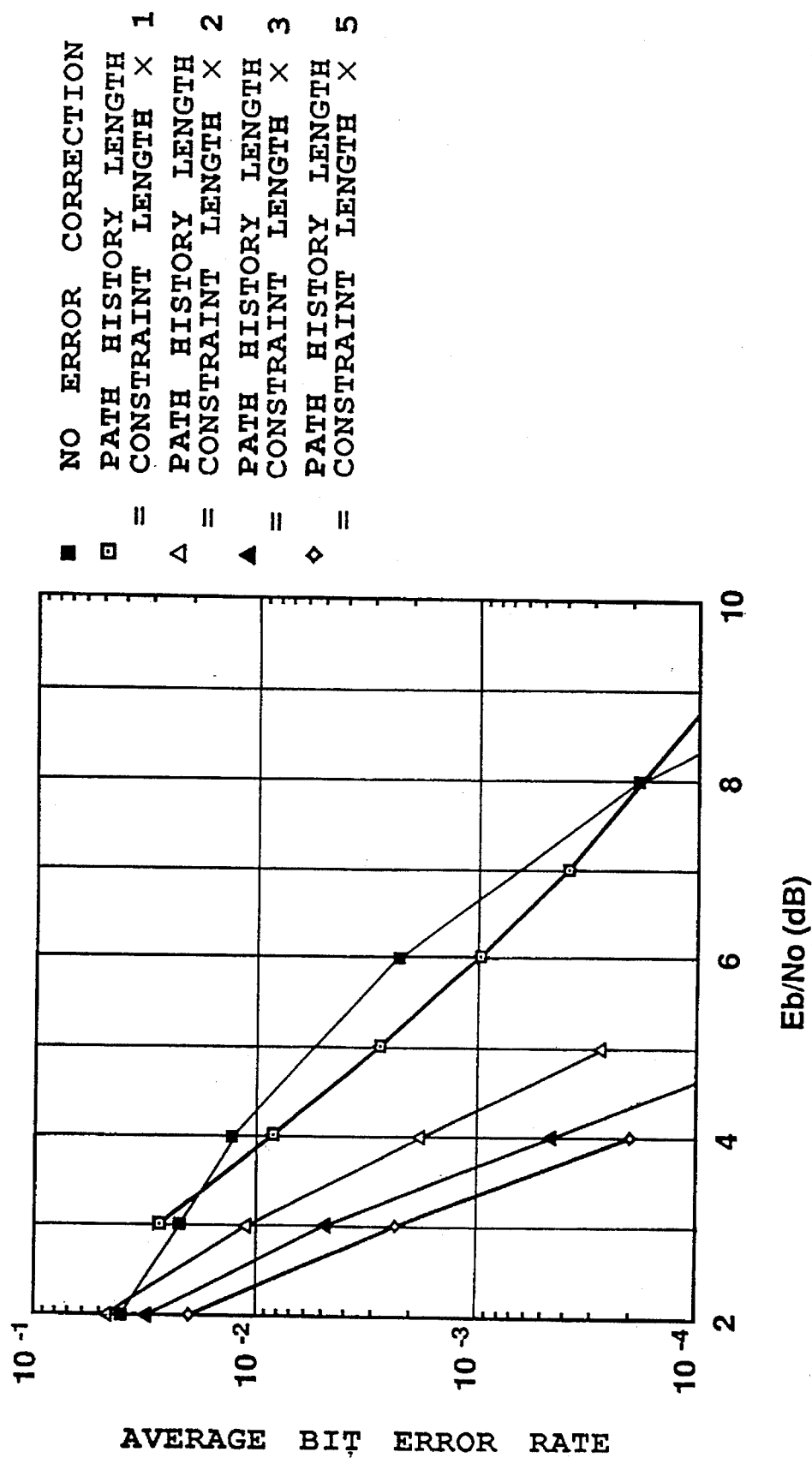
FIG. 3 is a diagram illustrating the behavior of the average bit error rate of a Viterbi decoder in terms of path memory lengths as a parameter.

FIG. 3 illustrates the behavior of the bit error rate of the Viterbi decoder in terms of the path history length as a parameter. In FIG. 3, the ordinate indicates an average bit error rate, and the abscissa indicates the ratio of signal power per bit (Eb) to noise power density (No). If the path history length of the Viterbi decoder equals the constraint length, the effect of the error correction cannot be achieved as illustrated in this figure, which shows that the error rate characteristics of the simplified Viterbi decoder nearly equal those when no error correction is carried out.

A bit error rate of $6 \times 10^{-3}$ can be achieved. If a received signal, which would produce an average bit error rate of $10^{-3}$ when decoded by a normal Viterbi decoder with the path history length of five times the constraint length, is decoded by a simplified Viterbi decoder with the path history length of twice the constraint length. This means that the bit error rate is reduced from $2 \times 10^{-2}$ to $6 \times 10^{-3}$, to approximately ⅓. A bit error rate of $2 \times 10^{-3}$ is achieved when the same received signal is decoded by a simplified Viterbi decoder with the path history length of three times the constraint length. This means that the bit error rate is reduced to 1/10 as compared with the case where no error correction is performed. In view of these, the path history length of the simplified Viterbi decoder that enables the transmission power control to follow instantaneous fluctuations is obtained from an information transmission rate and a supposed maximum Doppler frequency. For example, it is determined as twice the constraint length.

Figure 4A:
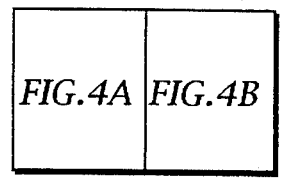
FIGS. 4A and 4B are block diagrams showing an embodiment of a transmission power control apparatus in accordance with the present invention.
Figure 4A:
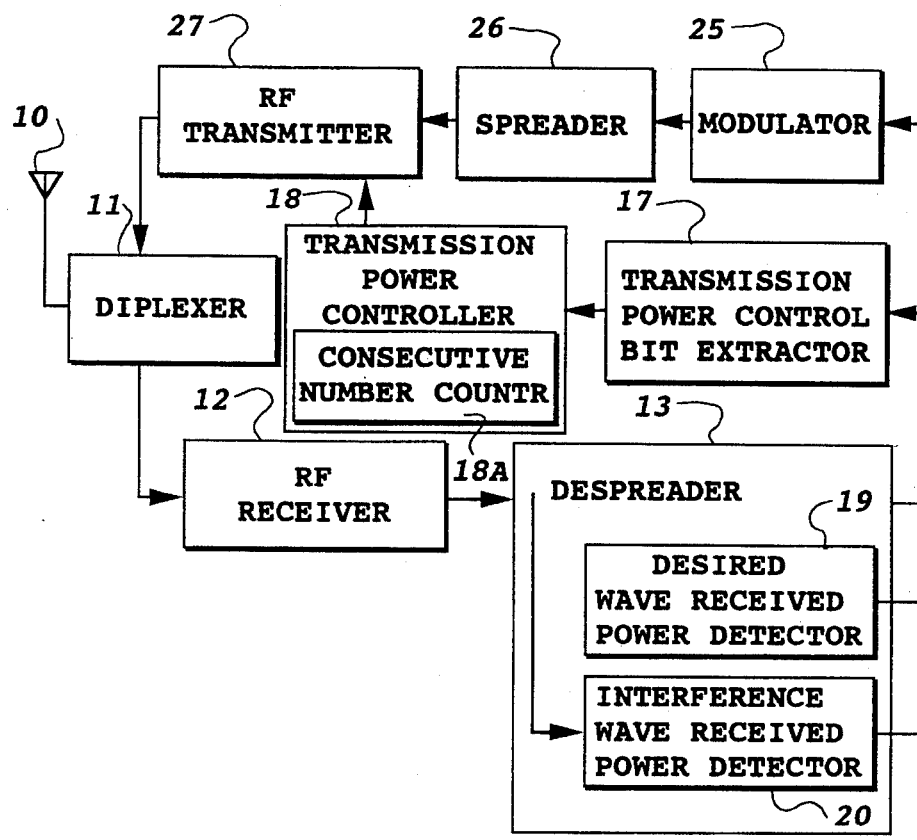
Figure 4B:
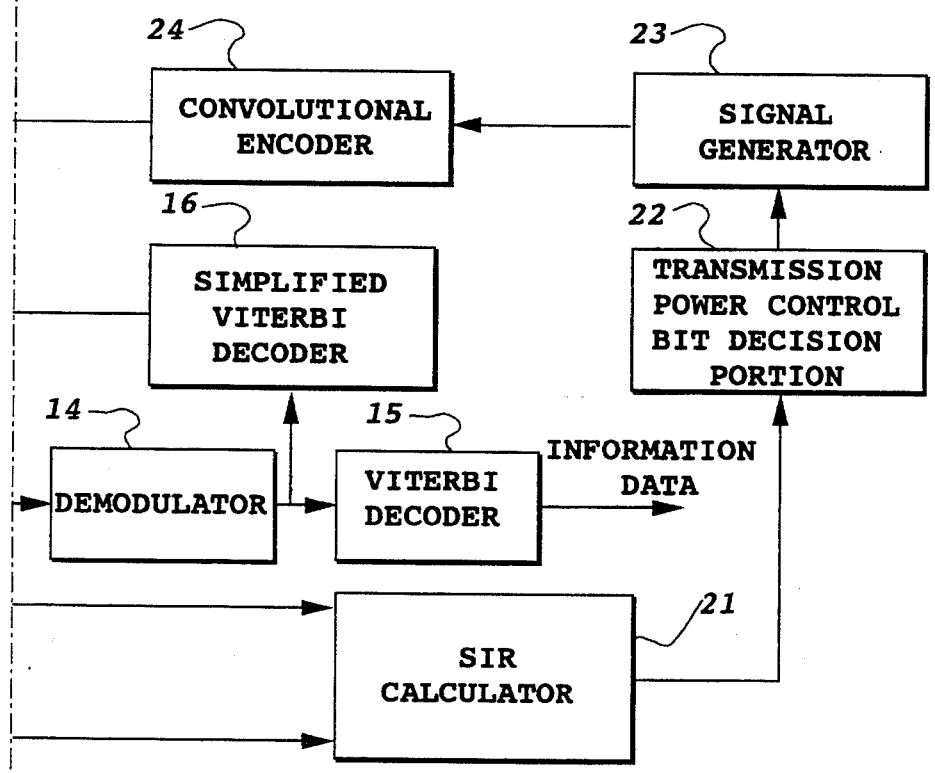

FIGS. 4A and 4B are block diagrams showing an embodiment of a spread-spectrum communication system in accordance with the present invention. In FIGS. 4A and 4B, the reference numeral 10 designates an antenna, the reference numeral 11 designates a diplexer, the reference numeral 12 designates an RF receiver, the reference numeral 13 denotes a despreader, the reference numeral 14 designates a demodulator, the reference numeral 15 designates a normal Viterbi decoder, the reference numeral 16 designates a simplified Viterbi decoder, the reference numeral 17 designates a transmission power control bit extractor, the reference numeral 18 designates a transmission power controller, the reference numeral 19 designates a desired wave received power detector, the reference numeral 20 designates an interference wave received power detector, the reference numeral 21 designates an SIR calculator, the reference numeral 22 designates a transmission power control bit decision portion, the reference numeral 23 designates a signal generator, the reference numeral 24 designates a convolutional encoder, the reference numeral 25 designates a modulator, the reference numeral 26 designates a spreader, and the reference numeral 27 designates an RF transmitter.

The operation of the base station will be described as follows referring to FIGS. 4A and 4B, although the mobile station has a similar arrangement and operates in a similar way. A spread-spectrum signal transmitted from a mobile station is received by the antenna 10. The received signal is inputted to the RF receiver 12 via the diplexer 11. In the RF receiver 12, the received signal is passed through a bandpass filter (BPF) to remove components outside the pass band, amplified by an amplifier, and down-converted to an intermediate frequency (IF) signal by a clock signal generated by a local oscillator. The IF signal is passed through a bandpass filter, and its level is corrected to an appropriate signal level by an automatic gain control circuit (AGC). The output of the AGC undergoes a pseudo-coherent detection, and is frequency-converted into a baseband signal.

The baseband signal is passed though a lowpass filter (LPF), undergoes an analog-to-digital (A/D) conversion, and is outputted as a digital signal. The digital signal outputted from the RF receiver 12 is despread by the despreader 13, and is outputted as a narrow band modulated signal. The modulated signal is demodulated by the demodulator 14.

The demodulated signal is divided into two portions. A first portion is supplied to the normal Viterbi decoder 15 including a path memory with the path history length of about five times the constraint length, and is decoded. A second portion is supplied to the simplified Viterbi decoder 16 including a path memory with the path history length shorter than that of the normal Viterbi decoder 15. The output of the normal Viterbi decoder 15 is used as information data, and the output of the simplified Viterbi decoder 16 is used to obtain the transmission power control bit used for the transmission power control.

The transmission power control bit extractor 17 extracts the transmission power control bit from the decoded signal by the simplified Viterbi decoder 16. The extracted transmission power control bit is supplied to the transmission power controller 18, which determines the transmission power of the base station on the basis of the transmission power control bit, and provides the RF transmitter 27 with control information. Thus, the transmission power of the base station is controlled.

Conversely, the desired wave received power detector 19 and the interference wave received power detector 20 in the despreader 13 detect the desired wave received power and the interference wave received power, respectively, on the basis of which, the SIR calculator 21 obtains the received SIR.

The transmission power control bit decision portion 22 compares the received SIR with a predetermined reference SIR, and produces transmission control bit which commands an increase in the transmission power of the mobile station when the received SIR is less than the reference SIR, whereas it produces the transmission control bit which commands a decrease in the transmission power of the mobile station when the received SIR is greater than the reference SIR, and supplies the transmission control bit to the signal generator 23.

The signal generator 23 forms a frame to be transmitted, which includes the transmission power control bit supplied from the transmission power control bit decision portion 22, and provides it to the convolutional encoder 24. The convolutional encoder 24 converts the signals, including the transmission power control bit and information data into convolutional codes. The output of the convolutional encoder 24, that is, the signal to be transmitted to the mobile station, is modulated by the modulator 25, spread by the spreader 26, and is supplied to the RF transmitter 27. The transmitted signal which is frequency converted to an IF and then to an RF band by the RF transmitter 27, is transmitted at the transmission power determined by the control information outputted from the transmission power controller 18.

EMBODIMENT 2

Figure 5:
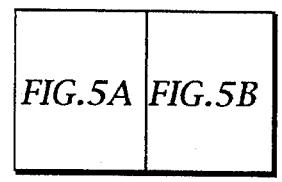
FIG. 5 is a chart showing arrangement of FIGS. 5A and 5B.
Figure 5A:
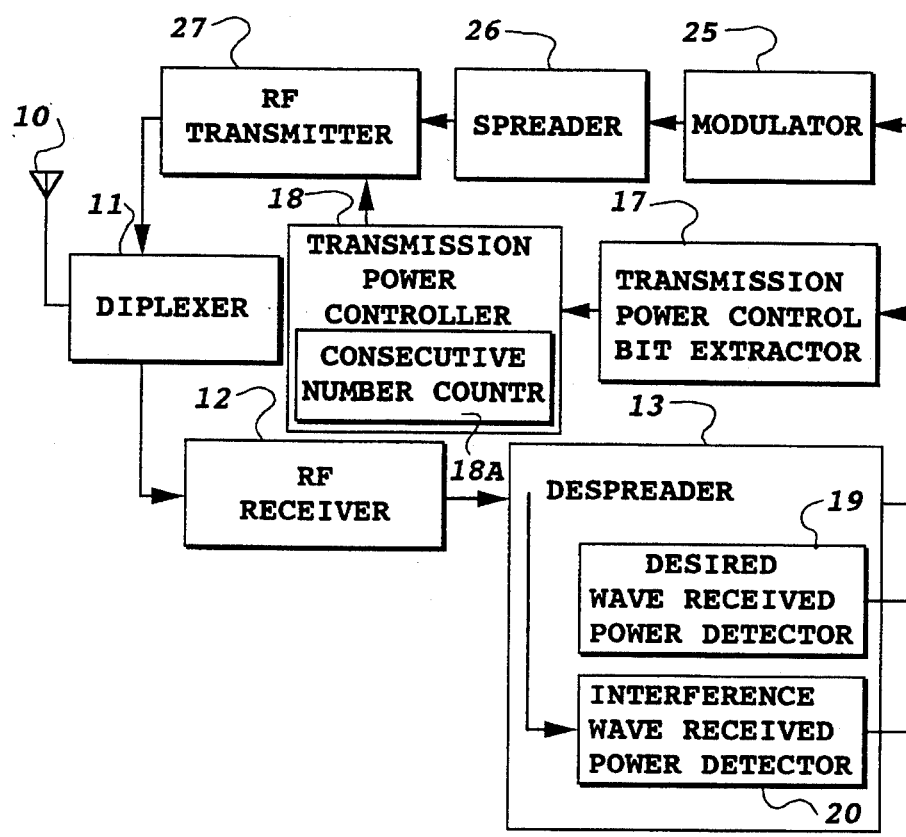
FIGS. 5A and 5B are block diagrams showing another embodiment of a transmission power control apparatus in accordance with the present invention.
Figure 5B:
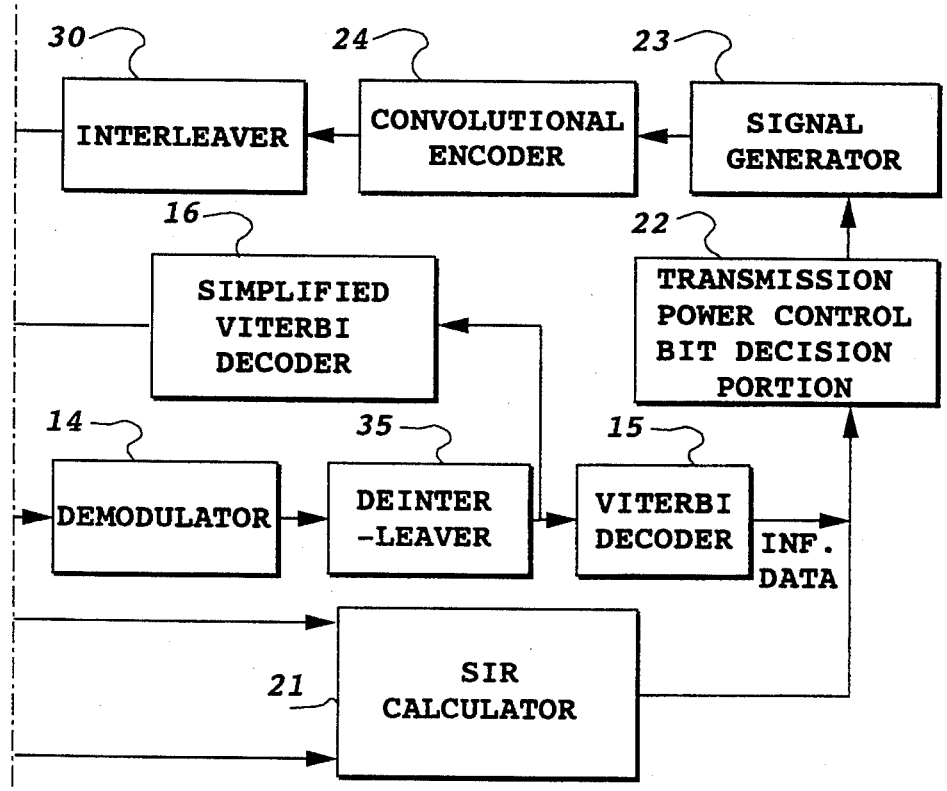

FIGS. 5A and 5B are block diagrams showing another embodiment of a spread-spectrum communication system in accordance with the present invention. In FIGS. 5A and 5B, hardware blocks having the same functions as those of FIGS. 4A and 4B are designated by the same reference numerals as in FIGS. 4A and 4B.

This embodiment is provided with an interleaver 30 and a deinterleaver 35 in addition to the system shown in FIGS. 4A and 4B. The interleaver 30 interleaves the signal converted into the convolutional codes, and the deinterleaver 35 reconverts the interleaved signal into the original signal. Thus, burst bit errors caused by fading are made random by the interleave in this embodiment. This makes it possible to improve the error correct ion ability of the convolutional coding/Viterbi decoding.

The present invention has been described in detail with respect to various embodiments, and it will now be apparent from the foregoing to those skilled in the art, that changes and modifications may be made without departing from the invention in its broader aspects, and it is the intention, therefore, in the appended claims to cover all such changes and modifications as fall within the true spirit of the invention.

What is claimed is:

1. A transmission power control method for radio communications using a CDMA (Code Division Multiple Access) system, said method controlling transmission power of a first transmitted signal radiated from a first station in accordance with a transmission power control signal contained in a second transmitted signal sent from a second station and received at the first station, said first and second transmitted signal being expressed in the form of convolutional codes, said method comprising the steps of:

decoding, at the first station, said second transmitted signal by using a first Viterbi decoder including a path memory with a path history length of a first predetermined length;

decoding, at the first station, said second transmitted signal by using a second Viterbi decoder including a path memory with a path history length of a second predetermined length which is shorter than said first predetermined length;

extracting, at the first station, said transmission power control signal contained in said second transmitted signal from an output of said second Viterbi decoder;

controlling, at the first station, the transmission power of said first transmitted signal of said first station by using said transmission power control signal extracted from the output of said second Viterbi decoder; and obtaining, at the first station, information data other than said transmission power control signal from an output of said first Viterbi decoder.

2. The transmission power control method as claimed in claim 1, wherein said first predetermined path history length is five times a constraint length of said convolutional codes, and said second predetermined path history length is twice the constraint length.

3. The transmission power control method as claimed in claim 1, further comprising the steps of:

measuring, at the second station, received power of said first transmitted signal from said first station;

determining, at the second station, transmission power of said first transmitted signal on the basis of said received power;

generating, at the second station, said transmission power control signal corresponding to said transmission power determined at the step of determining;

inserting, at the second station, said transmission power control signal into said second transmitted signal;

performing, at the second station, convolutional encoding of said second transmitted signal which includes said transmission power control signal; and transmitting said second transmitted signal from said second station.

4. The transmission power control method as claimed in claim 3, wherein said first station is a mobile station and said second station is a base station of the CDMA system.

5. The transmission power control method as claimed in claim 3, wherein said first station is a base station and said second station is a mobile station of the CDMA system.

6. The transmission power control method as claimed in claim 1, further comprising the steps of:

interleaving, at the first station, said convolutional codes to produce an interleaved signal;

modulating, at the first station, said interleaved signal to produce a modulated signal;

spreading, at the first stat ion, said modulated signal by using a spreading code to produce a spread signal; and transmitting said spread signal from said first station to said second station.

7. The transmission power control method as claimed in claim 6, further comprising the steps of:

receiving, at the second station, said spread signal sent from said first station;

despreading, at the second star ion, said spread signal by using a replica of said spreading code to produce a despread signal;

demodulating, at the second station, the despread signal to produce a demodulated signal;

deinterleaving, at the second station, said demodulated signal to produce a deinterleaved signal; and providing, at the second station, said first Viterbi decoder and said second Viterbi decoder with said deinterleaved signal.

8. A transmission power control apparatus for radio communications using a CDMA (Code Division Multiple Access) system, said apparatus controlling transmission power of a first transmitted signal radiated from a first station in accordance with a transmission power control signal contained in a second transmitted signal sent from a second station and received at the first station, said first and second transmitted signal being expressed in the form of convolutional codes, said apparatus comprising:

means for decoding, at the first station, said second transmitted signal by using a first Viterbi decoder including a path memory with a path history length of a first predetermined length;

means for decoding, at the first station, said second transmitted signal by using a second Viterbi decoder including a path memory with a path history length of a second predetermined length which is shorter than said first predetermined length;

means for extracting, at the first station, said transmission power control signal contained in said second transmitted signal from an output of said second Viterbi decoder;

means for controlling, at the first station, the transmission power of said first transmitted signal of said first station by using said transmission power control signal extracted from the output of said second Viterbi decoder; and means for obtaining, at the first station, information data other than said transmission power control signal from an output of said first Viterbi decoder.

9. The transmission power control apparatus as claimed in claim 8, wherein said first predetermined path history length is five times a constraint length of said convolutional codes, and said second predetermined path history length is twice the constraint length.

10. The transmission power control apparatus as claimed in claim 8, further comprising:

means for measuring, at the second station, received power of said first transmitted signal from said first station;

means for determining, at the second station, transmission power of said first transmitted signal on the basis of said received power;

means for generating, at the second station, said transmission power control signal corresponding to said transmission power determined by said means for determining;

means for inserting, at the second station, said transmission power control signal into said second transmitted signal;

means for performing, at the second station, convolutional encoding of said second transmitted signal which includes said transmission power control signal; and means for transmitting said second transmitted signal from said second station.

11. The transmission power control apparatus as claimed in claim 10, wherein said first station is a mobile station and said second station is a base station of the CDMA system.

12. The transmission power control apparatus as claimed in claim 10, wherein said first station is a base station and said second station is a mobile station of the CDMA system.

13. The transmission power control apparatus as claimed in claim 8, further comprising:

means for interleaving, at the first station, said convolutional codes to produce an interleaved signal;

means for modulating, at the first station, said interleaved signal to produce a modulated signal;

means for spreading, at the first station, said modulated signal by using a spreading code to produce a spread signal; and means for transmitting said spread signal from said first station to said second station.

14. The transmission power control apparatus as claimed in claim 13, further comprising:

means for receiving, at the second station, said spread signal sent from said first station;

means for despreading, at the second station, said spread signal by using a replica of said spreading code to produce a despread signal;

means for demodulating, at the second station, the despread signal to produce a demodulated signal;

means for deinterleaving, at the second station, said demodulated signal to produce a deinterleaved signal; and means for providing, at the second station, said first Viterbi decoder and said second Viterbi decoder with said deinterleaved signal.

* * * * *